United States Patent
Pan et al.

(10) Patent No.: US 9,735,581 B2
(45) Date of Patent: Aug. 15, 2017

(54) METHOD AND APPARATUS FOR OBTAINING ELECTRICITY FROM OFFSHORE WIND TURBINES

(71) Applicant: ABB Technology AG, Zurich (CH)

(72) Inventors: Jiuping Pan, Raleigh, NC (US); Debrup Das, Raleigh, NC (US); Xiaoming Feng, Cary, NC (US)

(73) Assignee: ABB Schweiz AG, Baden (CH)

( * ) Notice: Subject to any disclaimer, the term of this patent is extended or adjusted under 35 U.S.C. 154(b) by 621 days.

(21) Appl. No.: 14/253,590

(22) Filed: Apr. 15, 2014

(65) Prior Publication Data
US 2015/0260162 A1 Sep. 17, 2015

Related U.S. Application Data

(60) Provisional application No. 61/953,111, filed on Mar. 14, 2014.

(51) Int. Cl.
*H02J 3/38* (2006.01)
*F03D 9/00* (2016.01)
(Continued)

(52) U.S. Cl.
CPC ............... *H02J 3/38* (2013.01); *F03D 9/257* (2017.02); *H02J 3/34* (2013.01); *H02J 3/386* (2013.01);
(Continued)

(58) Field of Classification Search
CPC ... Y02E 10/727; Y02E 10/725; Y02E 10/722; Y02E 10/763; F03D 7/0276;
(Continued)

(56) References Cited

U.S. PATENT DOCUMENTS

| 4,703,189 A | * | 10/1987 | DiValentin | F03D 7/0224 290/44 |
| 8,388,481 B2 | * | 3/2013 | Han | H02P 9/04 180/364 |

(Continued)

FOREIGN PATENT DOCUMENTS

| CN | 1967961 A | 5/2007 |
| CN | 101950981 A | 1/2011 |

(Continued)

OTHER PUBLICATIONS

Santjer et al., "Wind Turbine Grid Connection and Interaction", Deutsches Windenergie—Institut GmbH, 2001, retrieved from https://ec.europa.eu/energy/sites/ener/files/documents/2001_fp5_brochure_energy_env.pdf.*

(Continued)

*Primary Examiner* — Ryan Johnson
(74) *Attorney, Agent, or Firm* — Taft Stettinius & Hollister LLP

(57) ABSTRACT

According to one aspect of the teachings herein, various feeder connection arrangements and architectures are disclosed, for collecting electricity from wind turbines in an offshore collection grid that operates at a fixed low frequency, e.g., at one third of the targeted utility grid frequency. Embodiments herein detail various feeder arrangements, such as the use of parallel feeder connections and cluster-based feeder arrangements where a centralized substation includes a common step-up transformer for outputting electricity at a stepped-up voltage, for low-frequency transmission to onshore equipment. Further aspects relate to advantageous generation arrangements, e.g., tower-based arrangements, for converting wind power into electrical power using, for example, medium-speed or high-speed gearboxes driving generators having a rated electrical frequency for full-power output in a range from about 50 Hz to (Continued)

about 150 Hz, with subsequent conversion to the fixed low frequency for off-shore collection.

13 Claims, 4 Drawing Sheets

(51) Int. Cl.
 H02J 3/34 (2006.01)
 F03D 9/25 (2016.01)
(52) U.S. Cl.
 CPC ........... Y02E 10/725 (2013.01); Y02E 10/727 (2013.01); Y02E 10/763 (2013.01); Y10T 307/664 (2015.04)
(58) Field of Classification Search
 CPC ........ F03D 7/0284; F03D 9/003; F03D 9/005; H02J 3/34; H02J 3/386; Y10T 307/664
 See application file for complete search history.

(56) References Cited

U.S. PATENT DOCUMENTS

| | | | | |
|---|---|---|---|---|
| 8,558,405 | B2* | 10/2013 | Brogan | H02J 3/386 290/55 |
| 8,587,141 | B2* | 11/2013 | Bjerknes | F03D 7/0224 290/44 |
| 8,994,206 | B2* | 3/2015 | Bala | H02J 3/386 290/55 |
| 9,133,825 | B2* | 9/2015 | Andresen | H02J 3/24 |
| 2003/0227172 | A1 | 12/2003 | Erdman et al. | |
| 2011/0049994 | A1* | 3/2011 | Hiller | F03D 9/002 307/82 |
| 2012/0069610 | A1 | 3/2012 | Trainer et al. | |

FOREIGN PATENT DOCUMENTS

| | | |
|---|---|---|
| CN | 103311951 A | 9/2013 |
| EP | 1276224 A1 | 1/2003 |
| EP | 2161443 A2 | 3/2010 |
| WO | 2012048743 A1 | 4/2012 |

OTHER PUBLICATIONS

Chen, Hao, "Advances in wind power generation, transmission, and simulation technology", Iowa State University, Graduate Theses and Dissertations, Paper 12957, 2012, 1-133.
De Vries, Eize, "The Vestas V164 and drivetrain choice", WindPower Monthly, Webcast: Drive operational efficiency come rain or shine, available at http://www.windpowermonthly.com/article/1169347/vestas-v164-drivetrain-choice, obtained on May 14, 2013, Feb. 8, 2013, 1-5.
Erickson, R., "A New Family of Multilevel Matrix Converters for Wind Power Applications: Final Report", National Renewable Energy Laboratory, Contract No. DE-AC36-99-GO10337, Subcontract Report NREL/SR-500-40051, Golden, Colorado, Jul. 2002-Mar. 2006, 1-468.
Miura, Yushi et al., "Modular Multilevel Matrix Converter for Low Frequency AC Transmission", 2013 IEEE, 2013, 1079-1084.
Tenca, Pierluigi et al., "Wind Turbine Current-Source Converter Providing Reactive Power Control and Reduced Harmonics", IEEE Transactions on Industry Applications, vol. 43, No. 4, Jul./Aug. 2007, 1050-1060.
Unknown, Author, "FusionDrive 3-10", Moventas, available online at http://www.moventas.com/products/fusion-drive/, obtained on May 14, 2014, 1-4.
Unknown, Author, "Fusiondrive, the most advanced wind turbine drivetrain, successful in testing", Moventas, Apr. 4, 2013 Press Release, available at http://www.moventas.com/news/press-releases, obtained on May 14, 2014, Apr. 4, 2013, 1-2.
Van Wyk, Liezl, "Diavik Diamond Mine Wind Farm Project", http://www.bullfrogpower.com/remotemicrogrids/presentations/session_6_diavik_diamond_mine.pdf, Jun. 26, 2013, 1-15.
Venkat, Jakka et al., "Power Electronic Transformers in Smart Grids", IEEMA TRAFOTECH 2014, 9th International Conference on Transformers, Indian Institute of Technology Bombay, Mumbai-400076, 2014, 1-8.
Wang, Xiongfei et al., "A Review of Power Electronics Based Microgrids", Journal of Power Electronics, vol. 12, No. 1, JPE 12-1-23, Jan. 2012, 181-192.
Yazdani, Amirnaser et al., "A Neutral-Point Clamped Converter System for Direct-Drive Variable-Speed Wind Power Unit", IEEE Transactions on Energy Conversion, vol. 21, No. 2, Jun. 2006, 596-607.
Yang, Q., et al., "Research on Wind Power Connected to Power Grid by Fractional Frequency Transmission System," Power and Energy Engineering Conference (APPEEC), 2010 Asia-Pacific. Mar. 28-31, 2010. pp. 1-4. Chengu, China.
Qin, N., et al., "Offshore Wind Farm Connection with Low Frequency AC Transmission Technology," Power & Energy Society General Meeting, 2009. PES General Meeting. IEEE. Jul. 26-30, 2009. pp. 1-8. Calgary, Alberta, Canada.
Fischer, W., et al., "Low Frequency High Voltage Offshore Grid for Transmission of Renewable Power," 2012 3rd IEEE PES International Conference and Exhibition on Innovative Smart Grid Technologies (ISGT Europe); Oct. 14-17, 2012. pp. 1-6. Berlin, Germany.
Cho, Y., et al, "LFAC-Transmission Systems for Remote Wind Farms Using a Three-phase, Six-pulse Cycloconverter," IEEE. 2012. pp. 1-7.
Song, Z., et al, "Optimal Control Study for Fractional Frequency Wind Power System," 2012 Asia-Pacific Power and Energy Engineering Conference (APPEEC). Mar. 27-29, 2012. pp. 1-5. Shanghai, China.
Mau, C.N., et al, "Grid Connection of Offshore Wind Farm based DFIG with Low Frequency AC Transmission System," IEEE PES GM. 2012. pp. 1-7. San Diego, California, US.
Wang, X., "Integrating Wind Power Plant via Fractional Frequency Transmission System," Presentation at UK-China Strategic Workshop on Smart Grids. 2010. pp. 1-31. Oxford, United Kingdom.
Ning, L., et al., "Experiment on Wind Power Integration Grid via Fractional Frequency Transmission System—Realization of the Variable-speed Variable-frequency Power Wind," 2011 4th International Conference on Electric Utility Deregulation and Restructuring and Power Technologies (DRPT). Jul. 6-9, 2011. pp. 444-449. Weihai, Shandong, China.
Chen., H., et al, "Low-Frequency AC transmission for Offshore Wind Power," IEEE Transactions on Power Delivery. Oct. 2013. pp. 2236-2244. vol. 28, Issue 4.
Cho, Y., et al., "Advanced Time Domain Method for Remote Wind Farms with LFAC Transmission Systems: Power Transfer and Harmonics," 2012 IEEE 15th International Conference on Harmonics and Quality of Power (ICHQP), 2012. pp. 1-7. Hong Kong.
Author Unknown, "Investigation of Low Frequency Offshore AC Networks," Thesis Proposal Master Energy. 2013-2014. pp. 1-1.

* cited by examiner

METHOD AND APPARATUS FOR OBTAINING ELECTRICITY FROM OFFSHORE WIND TURBINES

RELATED APPLICATIONS

This application claims priority under 35 U.S.C. §119 from U.S. Provisional Patent Application No. 61/953,111 filed on 14 Mar. 2014, the content of said application incorporated herein by reference in its entirety.

TECHNICAL FIELD

The present invention generally relates to offshore wind turbines and particularly relates to obtaining electricity from offshore wind turbines.

BACKGROUND

Typical large-scale offshore wind farm architectures include a plurality of wind turbines, along with generators and collection networks, for collecting the generated electricity and transmitting it to shore, e.g., via high-voltage DC, HVDC, or high-voltage AC, HVAC, transmission systems. The choice of HVAC or HVDC transmission depends mainly on the distance from the offshore wind farm to the onshore grid connection point.

The use of low-frequency AC, LFAC, transmission at high voltages to the onshore grid connection point has also been considered. While LFAC transmission from the offshore wind farm requires additional frequency conversion equipment at the onshore grid connection point, its usage can extend the economic distance of HVAC connections between the offshore wind farm and the onshore grid connection point.

In a known approach to low-frequency collection and transmission of electricity in offshore wind farms, low-speed generators produce AC outputs with a nominal frequency of 16.7 Hz or 20 Hz. The generated electricity is coupled into the LFAC transmission system using one or more boost transformers. However, it is recognized herein that this approach suffers from a number of disadvantages, including necessitating the use of undesirably large equipment.

SUMMARY

According to one aspect of the teachings herein, various feeder connection arrangements and architectures are disclosed, for collecting electricity from wind turbines in an offshore collection grid that operates at a fixed low frequency, e.g., at one third of the targeted utility grid frequency. Embodiments herein detail various feeder arrangements, such as the use of parallel feeder connections and cluster-based feeder arrangements where a centralized substation includes a common step-up transformer for outputting electricity at a stepped-up voltage, for low-frequency transmission to onshore equipment. Further aspects relate to advantageous generation arrangements, e.g., tower-based arrangements, for converting wind power into electrical power using, for example, medium-speed or high-speed gearboxes driving generators having a rated electrical frequency for full-power output in a range from about 50 Hz to about 150 Hz, with subsequent conversion to the fixed low frequency.

In an example embodiment, a system is configured for obtaining electricity in an offshore wind turbine farm. The system includes at least a first arrangement that comprises a gearbox, a generator, and an AC-to-AC converter. The gearbox is configured to mechanically convert a first variable rotational speed of a wind turbine into a corresponding higher second variable rotational speed. The generator has a rated electrical frequency for full-power output in a range from about 50 Hz to about 150 Hz, and is configured to be driven at the variable second rotational speed by an output of the gearbox. The generator thereby generates electricity at a correspondingly variable first frequency and the AC-to-AC converter is configured to convert the electricity from the generator into electricity output from the AC-to-AC converter at a fixed low frequency for off-shore collection at the fixed low frequency. The fixed low frequency is lower than the utility grid frequency, e.g., one-third of the frequency of the targeted onshore utility grid.

In some embodiments, the first arrangement further comprises a step-up transformer connected between the generator and the AC-to-AC converter. The step-up transformer has a rated frequency corresponding to the rated electrical frequency of the generator and is configured to step up a voltage of the electricity output from the generator, and thereby output electricity at a stepped-up voltage. Correspondingly, the AC-to-AC converter is configured to convert the electricity output at the stepped-up voltage from step-up transformer. Thus, it will be understood that in some embodiments the AC-to-AC converter operates on the variable-frequency electricity as directly output from the generator, and in other embodiments it operates on the electricity output from a transformer that is connected between the AC-to-AC converter and the generator.

In another embodiment, a method of obtaining electricity from an offshore wind turbine farm includes mechanically converting a variable first rotational speed of a wind turbine into a corresponding higher variable second rotational speed, and generating electricity at a variable first frequency using a generator having a rated electrical frequency for full-power output in a range from about 50 Hz to about 150 Hz. The generator is driven at the variable second rotational speed and the method further includes converting the variable-frequency electricity output from the generator into a fixed low frequency for offshore collection at the fixed low frequency. Conversion to the fixed low frequency may operate directly on the output from the generator, or may operate on the output of a step-up transformer that is driven by the output from the generator. The fixed low frequency is in a range from about 16 Hz to about 20 Hz, for example.

In a further example embodiment, a system is configured for obtaining electricity in an offshore wind turbine farm that includes a plurality of wind turbines. The system includes an arrangement corresponding to each wind turbine. Each arrangement includes a gearbox, a generator, and an AC-to-AC converter. The gearbox is configured to mechanically convert a variable first low rotational speed of the corresponding wind turbine to a higher variable second rotational speed. The generator has a rated electrical frequency for full-power output in a range from about 50 Hz to about 150 Hz, and outputs electricity at a variable first frequency, based on being driven by the gearbox at the variable second rotational speed. Correspondingly, the AC-to-AC converter is configured to convert the electricity from the generator, either taken directly from the generator or through a step-up transformer, into output electricity at a fixed low frequency, which is lower than the grid frequency of the targeted onshore electrical grid.

Further, the example system includes an offshore low-frequency collection grid that comprises one or more feeders. Each feeder is associated with one or more of the arrangements and is configured to collect the electricity output from the associated arrangements at the fixed low frequency.

Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
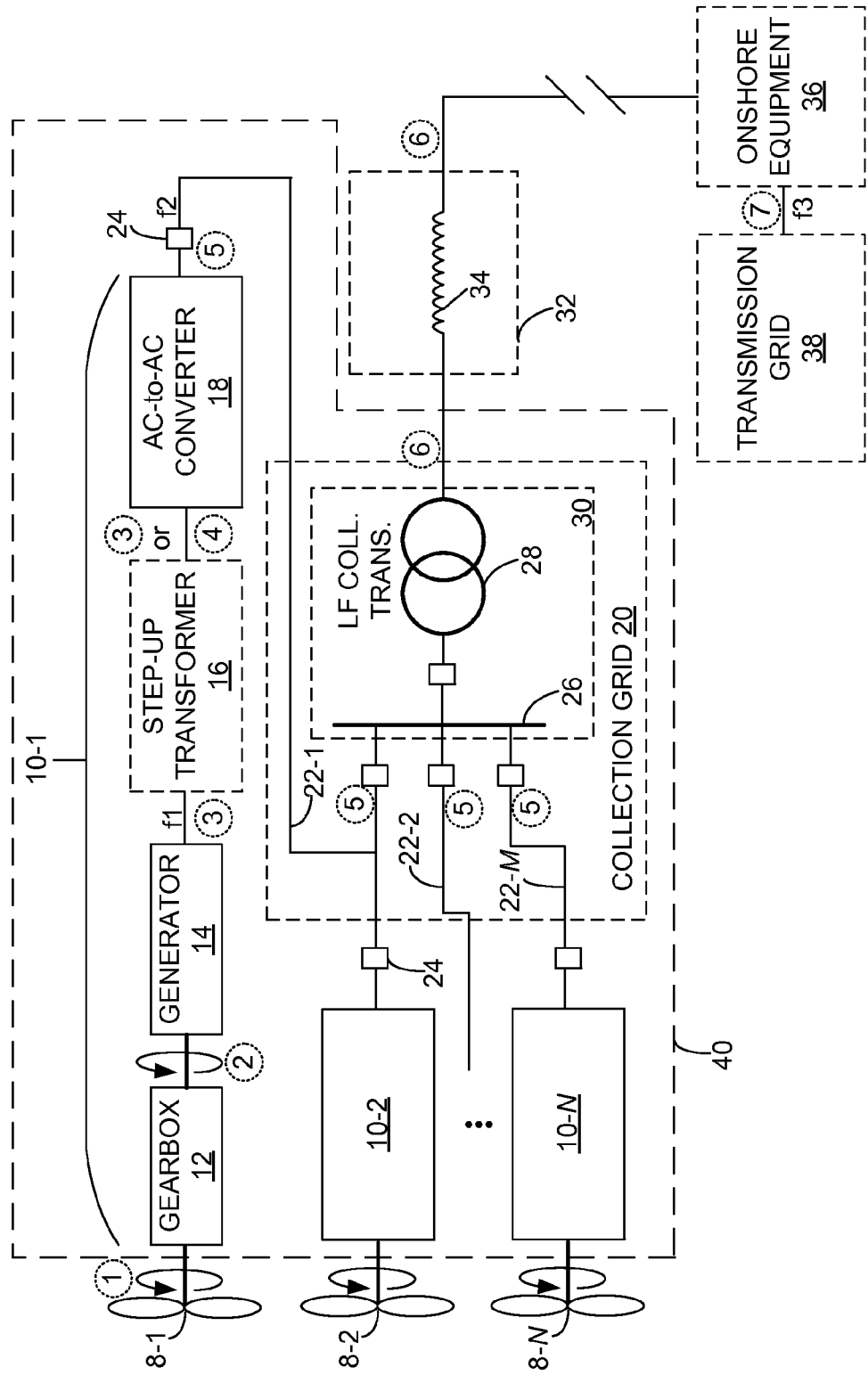
FIG. 1 is a block diagram of one embodiment of a system and arrangement for obtaining electricity from an offshore wind turbine farm.

FIG. 1 illustrates a plurality of like arrangements 10-1, 10-2, . . . , and 10-N, each of which is configured to obtain electricity in an offshore wind farm. More particularly, each arrangement is associated with a given wind turbine 8, and includes a gearbox 12, a generator 14, an optional step-up transformer 16, and an AC-to-AC converter 18. Unless suffixes are needed for clarity, the reference numeral "10" will be used to refer to any given arrangement 10 in the singular sense, and to any given arrangements 10 in the plural sense.

The plurality of arrangements 10 connect to a low-frequency offshore collection grid 20, which includes one or more feeders 22, shown here as feeders 22-1, 22-2, . . . , 22-M. The value of M is an integer number generally less than the value of N—i.e., the number of arrangements 10—inasmuch as each feeder 22 usually will be associated with more than one arrangement 10. Broadly, however, each feeder 22 is coupled to one or more arrangements 10 among the plurality of arrangements 10 and collects the electricity from its associated arrangements 10 into the low-frequency offshore collection grid 20.

The diagram further depicts a number of protective devices 24 disposed at wind turbines 8 for coupling the corresponding arrangements 10 with the low-frequency offshore collection grid 20. Further protective devices 24 are used within a central substation 30 that is included in the low-frequency offshore collection grid 20 for coupling feeders 22 and low-frequency collection transformer 28 with the bus 26. In more detail, one sees that the output from the collection transformer 28, also referred to as the "step-up transformer 28," couples into a low-frequency high-voltage transmission system 32, which includes one or more transmission lines 34 that carry the electricity output from the low-frequency offshore collection grid 20 to onshore equipment 36. In turn, the onshore equipment 36 converts the electricity from the offshore wind into the correct frequency for the coupling into the onshore electric grid 38, with or without further voltage adjustments.

The onshore electric grid 38 comprises, for example, an onshore transmission system operating at 50 Hz or 60 Hz. In some embodiments, the low-frequency offshore collection grid 20 is configured to operate at one-third of the frequency of the onshore electric grid 38, e.g., at about 16 Hz for a 50 Hz utility grid frequency and at about 20 Hz for a 60 Hz utility grid frequency.

With these example details in mind, then, the diagram of FIG. 1 can be understood as disclosing a system 40 that is configured for obtaining electricity in an offshore wind turbine farm. In a minimal configuration, the system 40 includes at least a first one of the previously described arrangements 10. In some embodiments, that first arrangement 10 includes gearbox 12 that is configured to mechanically convert a variable first rotational speed of a wind turbine 8 into a higher variable second rotational speed. As a non-limiting example, the gearbox provides an input-to-output turns ratio of from about 10-to-1 to 100-to-1.

The first arrangement 10 further includes a generator 14 having a rated electrical frequency for full-power output in a range from about 50 Hz to about 150 Hz. For example, the generator 14 has a rated electrical frequency of 75 Hz, for full-power output. It is desired herein to generate electricity at frequencies substantially higher than the rotational speed of the wind turbine 8, and it will be appreciated that these higher frequencies can be obtained by mechanical gearing in the gearbox 12 and/or by configuring the number of electrical poles in the generator 14. However, the actual frequency of the electricity output from the generator 14 at any given instant will be proportional to the rotational speed of the wind turbine 8 and will vary with the rotational speed of the wind turbine 8.

The electricity output from the generator 14 is referred to herein as having a variable first frequency, denoted as f1 in the diagram. In a non-limiting example of actual operation, the first variable frequency may range from about 20 Hz to about 150 Hz, in dependence on actual wind speed. In more detail, the variable first frequency of the generated electricity may deviate or vary from the rated electrical frequency of the generator with variation of wind speed. For example, a generator 14 having a rated electrical frequency of 50 Hz for full-power output may generate electricity at a corresponding variable frequency in a range between about 20 Hz and about 50 Hz, according to changes in wind speed. At lower wind speeds, the generator may operate near 20 Hz, while at higher wind speeds, it may operate near 50 Hz.

The example first arrangement 10 further includes an AC-to-AC converter 18 that is configured to convert the electricity from the generator 14 into electricity that is output from the AC-to-AC converter 18 at a fixed low frequency, denoted as f2 in the diagram, for offshore collection at the fixed low frequency. The fixed low frequency is lower than the targeted utility grid frequency. In some situations it may be beneficial to choose this fixed low frequency to be a value of about one-third of the utility grid frequency, which is denoted as f3 in the diagram. Note that the AC-to-AC converter 18 operates on the electricity output from the generator 14 directly in cases where the step-up transformer 16 is omitted, and indirectly in cases where the step-up transformer 16 is included.

In that latter case, the first arrangement 10 further includes the step-up transformer 16 disposed or connected between the generator 14 and the AC-to-AC converter 18. The step-up transformer 16 has a rated frequency that matches or corresponds to the rated electrical frequency of the generator 14 in the first arrangement. That is, the rated frequency of the transformer 16 complements the rated frequency of the generator 14 and the generally higher electrical frequencies obtained with the disclosed configuration of the arrangement 10 advantageously results in the step-up transformer 16 having a lighter and more compact build than would be practical if the transformer 16 were rated, for example, for operation at or below 20 Hz.

The step-up transformer 16 is configured to step up a voltage of the electricity output from the generator 14, and thereby output electricity at a stepped-up voltage. Correspondingly, the AC-to-AC converter is configured to convert the electricity output at the stepped-up voltage from the step-up transformer 16. That is, the AC-to-AC converter 18 operates on the electricity at the stepped-up voltage. However, this electricity is still considered as being from the generator 14, inasmuch as it is directly obtained by stepping up the output voltage of the generator 14.

In one example of such an embodiment, the generator 14 is configured to output electricity in a voltage range of about 690 V to about 13 KV and the step-up transformer 16 is configured to output electricity in a voltage range of about 13 KV to about 72 KV. In the same or other embodiments, the AC-to-AC converter 18 is configured to output electricity at a fixed low frequency in the range of about 16 Hz to about 20 Hz. See the circled number annotations in FIG. 1 for reference.

Referring to these circled annotation numbers as "Item" numbers, Item 1 denotes the variable first rotational speed of the wind turbine 8. Item 2 denotes the higher variable second rotational speed of the gearbox output, as mechanically derived from the wind turbine input. Item 3 denotes the electricity output from the generator 14, which has a first voltage and the variable first frequency.

Continuing with the Item references, Item 4 denotes the electricity output from the step-up transformer 16, having a stepped-up voltage relative to the generator voltage. This stepped-up voltage may be referred to as a second voltage level, which is higher than the first voltage level provided by the generator 14. Because the step-up transformer 16 is included in some embodiments and not in others, the input to the AC-to-AC converter 18 is marked with Item 3 or Item 4, indicating that the AC-to-AC converter 18 may receive electricity at the first or second voltage level. In either case, the AC-to-AC converter 18 outputs electricity having a fixed low frequency, which is denoted as Item 5. It will be understood that the electricity at the output of the AC-to-AC converter 18 may be at the generator voltage, in embodiments that omit the step-up transformer 16, or at the stepped-up voltage of the step-up transformer 16, in embodiments that include the step-up transformer 16.

One further sees that the feeders 22 operate at whatever voltage is output from the AC-to-AC converters 18 that are coupled to each respective feeder 22. Thus, the Item 5 designation is propagated into the low-frequency offshore collection grid 20 and is carried across the bus or buses 26 within the offshore collection grid 20, for input to the substation step-up transformer 28. Correspondingly, the step-up transformer 28 steps up the collection grid voltage to a higher voltage, which may be referred to as a third voltage level or a transmission voltage, denoted by Item 6. This latter designation indicates that the voltage output from the step-up transformer 28 is the voltage used for the low-frequency high-voltage transmission system 32.

While it is contemplated to have a system 40 that includes only a first arrangement 10 as set forth above, other embodiments of the system 40 include a plurality of like arrangements 10, including the first arrangement 10. Each arrangement 10 is associated with a corresponding one of the wind turbines 8 in an offshore wind farm and each includes a gearbox 12, generator 14, and AC-to-AC converter 18. The "overall" system 40 in such embodiments further comprises one or more feeders 22 comprising an offshore low-frequency collection grid 20. Each such feeder 22 is configured to collect the electricity output from the AC-to-AC converter 18 of each arrangement 10. That is, each feeder 22 is associated with one or more of the arrangements 10 and is configured to "collect" the electricity output from the associated arrangements 10 at the fixed low frequency.

The offshore low-frequency collection grid 20 includes a substation 30 having a common step-up transformer 28 that is configured to step up the electricity collected by one or more of the feeders 22. Further, as previously noted, the offshore low-frequency collection grid is configured to output electricity at a stepped-up voltage for transmission to an onshore electric grid 38 via a low-frequency high-voltage transmission system 32. In some embodiments, each feeder 22 is configured for parallel collection of the electricity output by those arrangements 10 among the plurality of arrangements 10 that are coupled to the feeder.

Figure 2:
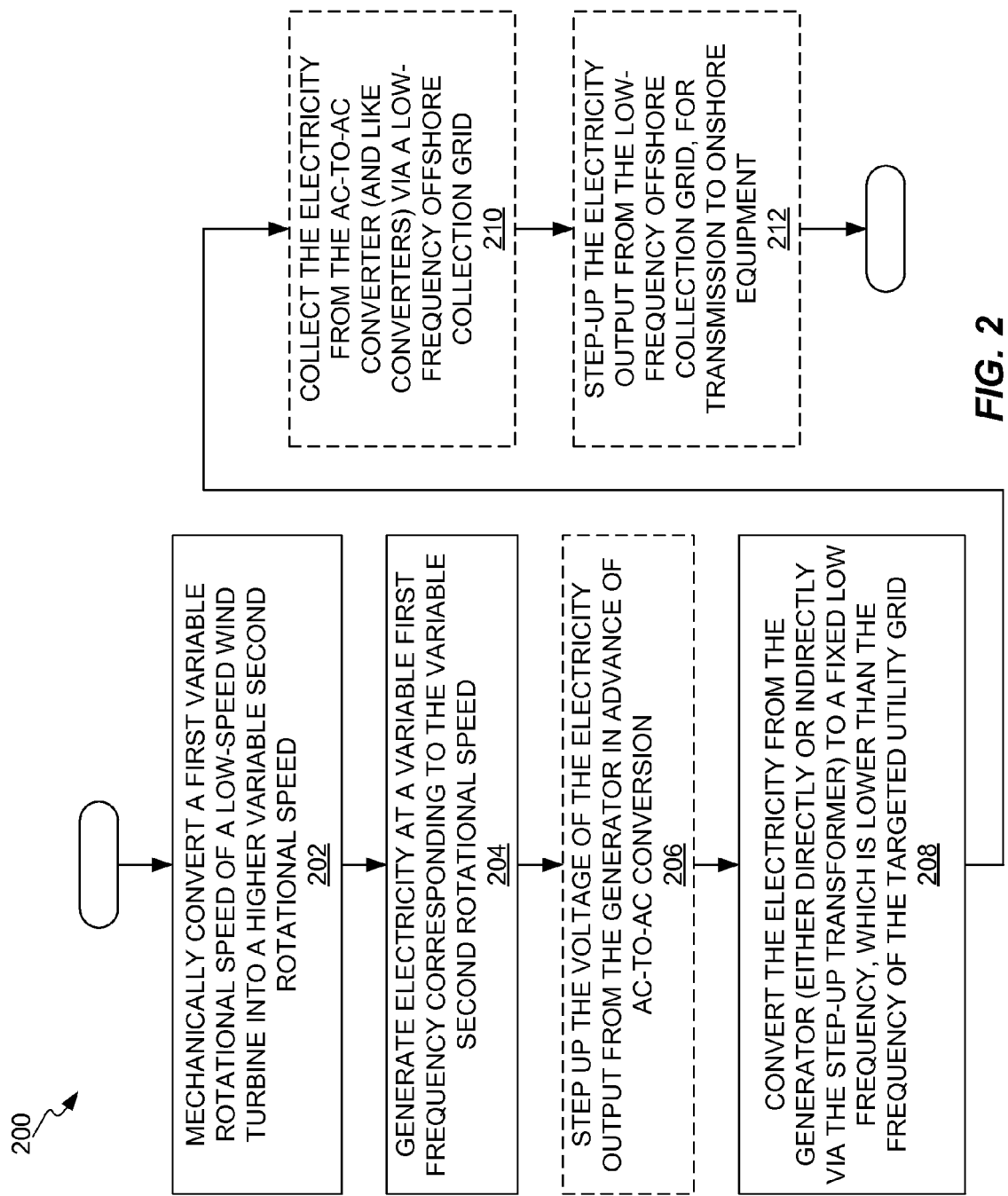
FIG. 2 is a logic flow diagram of one embodiment of a method of obtaining electricity from an offshore wind turbine.

FIG. 2 illustrates a related method 200 of obtaining electricity from an offshore wind turbine farm. The method 200 includes mechanically converting (Block 202) a variable first rotational speed of a wind turbine 8 into a corresponding higher variable second rotational speed, and generating (Block 204) electricity at a variable first frequency, based on driving a generator 14 at the variable second rotational speed. The generator 14 has a rated electrical frequency for full-power output in a range from about 50 Hz to about 150 Hz. Thus, while the nominal frequency of the electricity output from the generator 14 may be taken as its rated frequency, the actual electricity will have a variable first frequency that is a function of the wind speed.

The method 200 thus includes converting (Block 208) electricity output from the generator 14 into electricity at a fixed low frequency for offshore collection at the fixed low frequency. The fixed low frequency is lower than the grid frequency of the onshore electric grid 38.

Some embodiments include the further step or operation of stepping up (Block 206) the voltage of the electricity output from the generator 14, in advance of the conversion operation in Block 208. For example, each arrangement 10 includes a step-up transformer 16 connected between the generator 14 and the AC-to-AC converter 18 in the same arrangement 10. When included, the step-up transformer 16 has a rated electrical frequency that matches or otherwise corresponds to the rated electrical frequency of the generator 14.

The method 200 in some embodiments includes the further steps or operation of collecting (Block 210) the electricity output from the AC-to-AC converter used in Block 208 to obtain the electricity at the fixed low frequency, along with the electricity produced from any like converters 18 associated with other wind turbines 8 in the offshore wind farm, via a low-frequency offshore collection grid 20, and stepping up (Block 212) the voltage of the electricity output from the low-frequency offshore collection grid 20, for transmission to onshore equipment 36 via a low-frequency high-voltage transmission system 32. The onshore equipment 36 provides whatever frequency and/or voltage adjustments are required with respect to the onshore electric grid 38.

Referring back to FIG. 1 momentarily, the wind turbines 8 may be grouped and connected to different feeders 22 of the low-frequency offshore collection grid 20. In embodiments where each arrangement 10 includes a step-up transformer 16 between the generator 14 and the AC-to-AC converter 18, the output of the wind turbine 8 associated with each such arrangement 10 is made to "match" the desired voltage and frequency of the collection grid 20. In other words, the variable frequency and variable voltage output of each generator 14, which operates under varying wind speeds, is transformed to the rated frequency and rated voltage of the low-frequency offshore collection grid 20—e.g., an rated frequency of 20 Hz and a rated voltage of 33 KV. Advantageously, then, such arrangements 10 allow multiple wind turbines 8 to be connected in parallel to a given feeder 22. A feeder 22 operated at, say 33 KV, may transfer 30-50 MW of electric power economically. In a contemplated example, as many as ten wind turbines 8 are associated with a given feeder 22, each having a rated capacity of 5 MW, with additional feeders 22 obtaining electricity from further pluralities of wind turbines 8. The electricity is "collected" in parallel on each such feeder 22 and aggregated at the substation 30.

Figure 3C:
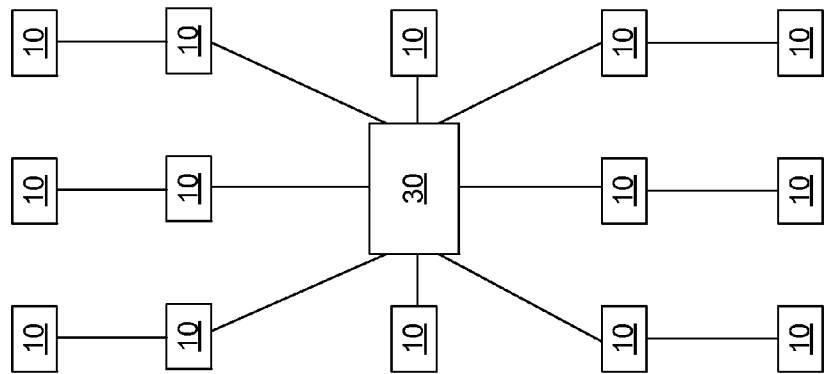
FIGS. 3A-3C are block diagrams of alternate embodiments of feeder networks within an offshore low-frequency collection grid, for collecting electricity from a plurality of wind turbines.
Figure 3B:
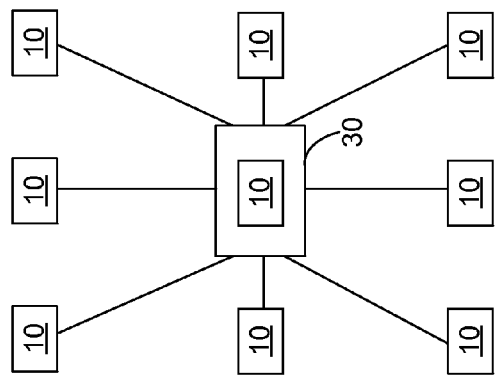
Figure 3A:
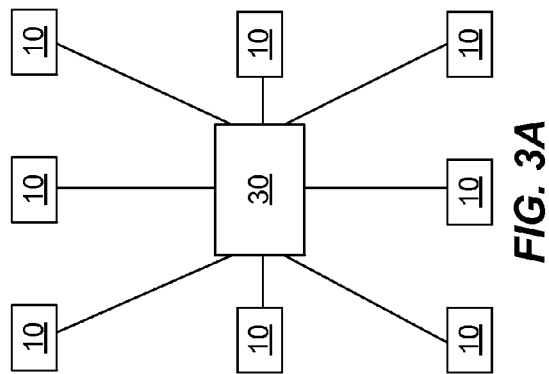

As non-limiting examples of other contemplated architectures, FIGS. 3A-3C illustrate various cluster-based collection architectures that are implemented by the low-frequency offshore collection grid 20 in various different embodiments. To appreciate these configurations, consider a system 40 in which generators 14 in the plurality of arrangements 10 are configured to output electricity in a voltage range of, say, 6.6 KV to 13.8 KV. Of course, higher output voltages may be configured, too. At such voltages, it is economical to couple the output of each generator 14 to the AC-to-AC converter 18 in the same arrangement 10, without use of the intervening step-up transformer 16.

The cluster-based collection architectures of FIGS. 3A-3C are particularly interesting in such cases. For example, FIG. 3A illustrates an example cluster comprising eight arrangements 10—each associated with a wind turbine 8—that are connected to one cluster platform substation 30 directly. There may be multiple such clusters in the low-frequency offshore collection grid 20.

FIG. 3B illustrates a similar cluster, but one in which nine arrangements 10 are included in the cluster, by virtue of including a wind turbine 8 and corresponding arrangement 10 directly on the same platform as used to support the substation 30. FIG. 3C provides yet another variation in which fifteen wind turbines 8—not explicitly shown—have their respective arrangements 10 connected to one cluster platform substation 30 directly, or via short feeders.

Cluster collection of wind turbines may be more suitable for medium sized wind farms. The collected wind powers are aggregated at the cluster platform substation. Step-up transformers—e.g., a step-up transformer 28 acting as a common step-up transformer for the cluster—are used to boost the voltage of the low-frequency offshore collection grid 20 to a higher, transmission voltage, for transmission to onshore equipment 36.

Figure 4:
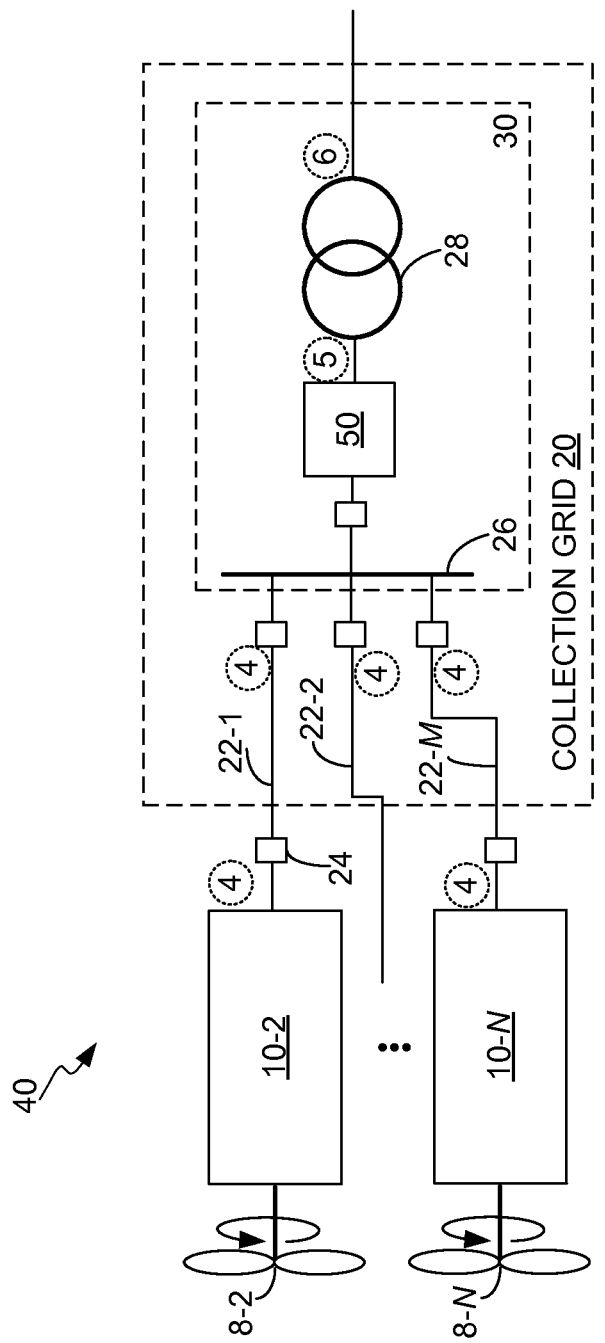
FIG. 4 is a block diagram of another embodiment of arrangements for obtaining electricity from respective offshore wind turbines and a corresponding embodiment for an offshore low-frequency collection grid.

FIG. 4 illustrates another variant of the cluster architecture, in which each arrangement 10 omits the AC-to-AC converter 18, and AC-to-AC conversion to the fixed low-frequency is instead handled by one or more AC-to-AC converters 50 that are centrally located, preferably on the same platform used to support the substation 30. Note that in the cluster-based architecture, the protective device 24 corresponding to a faulty wind turbine 8 or to a faulty arrangement 10 may be used to disconnect from the affected arrangement 10.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A system configured for obtaining electricity in an offshore wind turbine farm and including a first arrangement that comprises:
   a gearbox configured to mechanically convert a variable first rotational speed of a wind turbine into a higher variable second rotational speed;
   a generator having a rated electrical frequency for full-power output in a range from 50 Hz to 150 Hz, and configured to be driven at the variable second rotational speed by an output of the gearbox and to thereby generate electricity at a correspondingly variable first frequency; and
   an AC-to-AC converter configured to convert the electricity from the generator into electricity output from the AC-to-AC converter at a fixed low frequency for off-shore collection at the fixed low frequency, wherein the fixed low frequency is lower than a utility grid frequency; and
   a step-up transformer having a rated electrical frequency corresponding to the rated electrical frequency of the generator, wherein the step-up transformer is connected between the generator and the AC-to-AC converter, wherein the step-up transformer is configured to step up a voltage of the electricity output from the generator, and thereby output electricity at a stepped-up voltage, and wherein the AC-to-AC converter is configured to convert the electricity output at the stepped-up voltage from the step-up transformer.

2. The system of claim 1, wherein the generator is configured to output electricity in a voltage range of 690 V to 13 KV and wherein the step-up transformer is configured to output electricity in a voltage range of 13 KV to 72 KV.

3. The system of claim 1, wherein the AC-to-AC converter is configured to output electricity at a fixed low frequency in a range of 16 Hz to 20 Hz.

4. The system of claim 1, further comprising:
   a plurality of like arrangements, including the first arrangement; and
   one or more feeders comprising an offshore low-frequency collection grid;
   wherein each feeder is configured to collect the electricity output from the AC-to-AC converter of each arrangement that is coupled to the feeder.

5. The system of claim 4, wherein the offshore low-frequency collection grid includes a substation having a common step-up transformer that is configured to step up the electricity collected by one or more of the feeders, and to correspondingly output electricity at a stepped-up voltage for transmission to an onshore electric grid via a low-frequency, high-voltage transmission system.

6. The system of claim 4, wherein each feeder is configured for parallel collection of the electricity output by those arrangements among the plurality of arrangements that are coupled to the feeder.

7. A method of obtaining electricity from an offshore wind turbine farm comprising:

mechanically converting a variable first rotational speed of a wind turbine into a corresponding higher variable second rotational speed;

generating electricity at a variable first frequency via a generator having a rated electrical frequency for full-power output in a range from 50 Hz to 150 Hz and driven at the variable second rotational speed;

stepping up a voltage of the electricity output from the generator at the variable first frequency via a transformer having a rated electrical frequency corresponding to the rated electrical frequency of the generator, to obtain electricity at a stepped-up voltage and at the variable first frequency, and converting electricity output from the generator into electricity at a fixed low frequency for offshore collection at the fixed low frequency wherein the fixed low frequency is lower than a utility grid frequency, wherein converting the electricity output from the generator to electricity at the fixed low frequency comprises converting the electricity at the stepped-up voltage and at the variable first frequency into the electricity at the fixed low frequency.

8. The method of claim 7, further comprising obtaining electricity at the fixed low frequency in like manner from a plurality of wind turbines and collecting such electricity at the fixed low frequency from the plurality of wind turbines, via one or more feeders operating as an offshore low-frequency collection grid.

9. The method of claim 8, further comprising stepping up a voltage of the electricity, as collected via the one or more feeders, to output electricity at a stepped-up voltage and at the fixed low frequency, for transmission to an onshore electric grid via a low-frequency, high-voltage transmission system.

10. The method of claim 8, further comprising, for each feeder among the one or more feeders, using parallel electrical connections for each wind turbine associated with the feeder.

11. A system configured for obtaining electricity in an offshore wind turbine farm that includes a plurality of wind turbines, wherein the system comprises:

an arrangement corresponding to each wind turbine, each arrangement comprising:

a gearbox configured to mechanically convert a variable first rotational speed of the wind turbine to a corresponding higher variable second rotational speed;

a generator having a rated electrical frequency for full-power output in a range from 50 Hz to 150 Hz, and configured to be driven by the gearbox at the variable second rotational speed and thereby output electricity at a variable first frequency; and an AC-to-AC converter configured to convert electricity from the generator into electricity output from the AC-to-AC converter at a fixed low frequency that is lower than a utility grid frequency;

a step-up transformer connected between the generator and the AC-to-AC converter, and wherein the step-up transformer has a rated electrical frequency corresponding to the rated electrical frequency of the generator in that same arrangement and is configured to step up a voltage of the electricity output from the generator and thereby output electricity at a stepped-up voltage and at the variable first frequency, and wherein the electricity output from the AC-to-AC converter at the fixed low frequency is obtained from the electricity output from the step-up transformer; and an offshore low-frequency collection grid comprising one or more feeders, each feeder associated with one or more of the arrangements and configured to collect the electricity output from the associated arrangements at the fixed low frequency.

12. The system of claim 11, wherein the offshore low-frequency collection grid includes a step-up transformer configured to step up the electricity collected by the one or more feeders and thereby output electricity at a stepped up voltage and at the fixed low-frequency, for transmission to onshore equipment via a low-frequency, high-voltage transmission system.

13. The system of claim 11, wherein the offshore low-frequency collection grid includes a substation having a common step-up transformer that is configured to step up the electricity collected by one or more of the feeders, and to correspondingly output electricity at a stepped-up voltage for transmission to an onshore electric grid via a low-frequency, high-voltage transmission system.

\* \* \* \* \*